P. PETRACCHI.
DETACHABLE RIM FOR PNEUMATIC TIRES.
APPLICATION FILED OCT. 18, 1906.
944,906.
Patented Dec. 28, 1909.
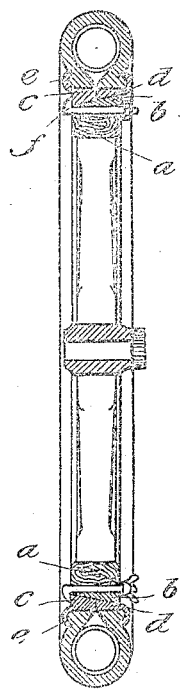
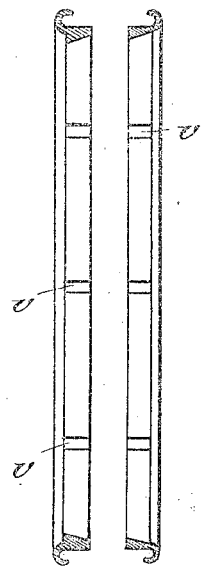
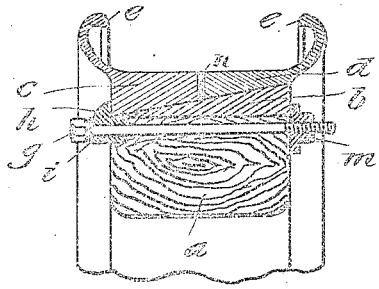
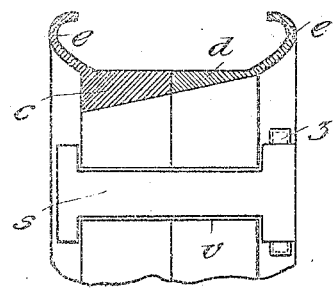
Inventor:
Pietro Petracchi,
Witnesses
E. O. Hildebrand
M. B. Taylor.
By Genji Masie
his Attorneys.

UNITED STATES PATENT OFFICE.

PIETRO PETRACCHI, OF VARESE, ITALY.

DETACHABLE RIM FOR PNEUMATIC TIRES.

944,906.

Specification of Letters Patent. Patented Dec. 28, 1909.

Application filed October 18, 1906. Serial No. 339,424.

*To all whom it may concern:*

Be it known that I, PIETRO PETRACCHI, a subject of the King of Italy, residing in Varese, Italy, have invented certain new and useful Improvements in Detachable Rims for Pneumatic Tires, of which the following is a specification.

In order to minimize the loss of time ensuing from punctures and similar accidents on motor car wheels fitted with pneumatic tires, the following device is sometimes resorted to: The rim carrying the pneumatic tire is so arranged as to allow of its being easily removed from and secured to the central part of the wheel. A spare rim fitted with an inflated pneumatic tire ready for use is carried on the car all along the travel and may be in a few minutes fitted in the place of the rim, the tire of which has been damaged during the run.

The present invention concerns detachable rims of the description above referred to.

According to the same the detachable rims are not made in one piece as usually, but are divided in two or more parts along a plane or planes perpendicular to the axis of the wheel. Said parts are kept together by joining pieces of any convenient description, but may be removed from each other to a certain extent after loosening said joining pieces, in which case they are still connected together by the outer cover of the pneumatic tires, the edges of which are properly secured to the outer face of the rim.

The accompanying drawings show by way of example how the present invention may be carried into practice.

Figure 1 shows a section along the axis of a complete wheel embodying the invention; Fig. 2 is a detail of the outer part of the wheel showing a somewhat different kind of connection between the removable rim and the wheel itself; Fig. 3 shows the removable rim divided into its two parts which are taken apart from each other; Fig. 4 shows, by way of example, how the said two parts may be connected together.

$a$ (Figs. 1 and 2) is one of the wooden fellies or rim segments, surrounded by a tight metal ring $b$; $c$ and $d$ are the two parts of which the removable rim consists. They are provided with suitably formed recesses $e$ intended to receive the edges of the outer cover, because they according to the present invention, are fastened to the removable rim. It may be understood that the outer shape of the rim may vary according to the nature of the tire employed.

The connection between the parts $a$, $b$, $c$ may be obtained by any convenient means, for instance by means of a hook bolt $f$ provided with an ordinary nut (Fig. 1 upper part) or with a thumb nut (Fig. 1 lower part). According to the modification shown in Fig. 2, the hook $h$ is loosely mounted upon the bolt stem, which is provided with a nut shaped head $g$, an elastic washer $i$ and an ordinary nut $m$, but instead of the elastic washer any other locking arrangement may be employed.

The two parts of the removable rim shown in Fig. 3 may be tightly pressed against each other, sometimes with the insertion of a packing stuff $n$ between the adjacent edges, as shown in Fig. 2 to protect the air tube from rain and dust, but a small play may be left in some cases between the said parts.

According to Fig. 4, which is given by way of example only, the connection between said parts is obtained by means of bolts $s$, located within the recesses $v$ and turning on the hinges $z$ with which one of said parts is provided.

The present invention removes the difficulty usually experienced in mounting the outer cover of the pneumatic tire by allowing one to fix the two parts of the rim on the corresponding edges of the cover, instead of forcing the cover into the rim. Secondly this arrangement allows of the air tube being changed without the necessity of changing the outer cover as long as the same is still available. To that effect, when the removable rim has been dismounted, the bolts $s$ are unlocked, the two parts $c$ and $d$ of said rim are brought apart so as to allow of the damaged air tube being taken out. A new tube is thereafter inserted into the outer cover through the interval between the adjacent edges of $c$ and $d$. While the air tube is being changed, the two parts $c$ and $d$ are kept together by the outer cover, but as soon as the replacement has taken place, the bolts $s$ are turned again upon their hinges and locked before the inflation of the air tube is proceeded with.

As the air tube gets damaged much more frequently than the outer cover, the advantage of being enabled to change the air tube without removing the whole tire is but too evident. When a motorist has his car fitted with this system, even if he has not brought along any spare rim ready for use, he can change a punctured tube much quicker and easier than by the ordinary system, while, if he carries one or two extra rims ready for use and besides some spare inner tubes, he is practically out of all danger of a break down, as, after having used, if necessary, his spare rims, he can, in case of new punctures, easily replace the inner tube. Moreover he can effect the change of the tube while the car is running and so prepare a new spare rim with inflated tube ready for use.

Having now described my invention and how the same is to be carried out, what I desire to claim is:

1. A detachable rim for pneumatic tires, divided in its medial portion along a plane perpendicular to its axis, each part provided with means to hold the outer tire-tube, the inner face of the two-part rim being beveled at an inclination to the axis, an annular wedge member arranged to fit between the beveled interior face of the rim and the cylindrical outer face of the felly, and means bearing from opposite directions against the thicker edge of the rim and the wedge member to lock the same together and to the felly.

2. A detachable rim for pneumatic tires, divided in its medial portion along a plane perpendicular to its axis, the inner face of the two-part rim recessed transversely at intervals, and tie-bolts arranged in the recesses to bind the two parts of the rim together independent of the wheel.

3. A detachable rim for pneumatic tires, divided in its medial portion along a plane perpendicular to its axis, the inner face of the two-part rim recessed transversely at intervals, and tie-bolts provided with a head at one end and hinged at the other end to one of the rim members, and arranged to lie in the recesses to clamp the two parts of the rim together between the hinged end and the head.

4. A detachable rim for pneumatic tires, divided in its medial portion along a plane perpendicular to its axis, each part provided with means to hold the outer tire-tube, the inner face of the two-part rim beveled at an inclination to the axis and recessed transversely at intervals, tie bolts provided with a head at one end and hinged at the other to one of the rim members and arranged to lie in the recesses to clamp the two parts of the rim together between the hinged ends and the heads, an annular wedge member arranged to fit between the beveled inner face of the rim and the outer face of the felly, and bolts arranged in the felly and overlapping at their extremities the thicker edge of the rim and of the wedge member to bind the whole firmly together.

The foregoing specification signed this fourth day of October 1906, at the American consulate in Milan, Italy.

PIETRO PETRACCHI.

In presence of these witnesses:
B. CARLO SALVATTI,
H. B. GURNY.